United States Patent
Lee et al.

(10) Patent No.: US 8,181,737 B2
(45) Date of Patent: May 22, 2012

(54) CONDENSED WATER DISCHARGE APPARATUS OF MUFFLER

(75) Inventors: Sang Il Lee, Suwon-si (KR); Hochan An, Seoul (KR); Hun Heo, Ulsan-si (KR); Seung-Jin Moon, Ulsan-si (KR)

(73) Assignees: Hyundai Motor Company, Seoul (KR); Sejong Industrial Co., Ltd, Ulsan-Si (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/869,998

(22) Filed: Aug. 27, 2010

(65) Prior Publication Data

US 2011/0120103 A1    May 26, 2011

(30) Foreign Application Priority Data

Nov. 20, 2009  (KR) .................. 10-2009-0112834

(51) Int. Cl.
*F01N 1/24* (2006.01)
(52) U.S. Cl. .................. 181/254; 181/227; 181/237
(58) Field of Classification Search .................. 181/220, 181/237, 254; 351/65.3
See application file for complete search history.

(56) References Cited

U.S. PATENT DOCUMENTS

| | | | | |
|---|---|---|---|---|
| 1,990,249 | A * | 2/1935 | Pieron | 181/278 |
| 4,527,659 | A * | 7/1985 | Harrington | 181/244 |
| 4,673,162 | A * | 6/1987 | Lachmann | 251/30.01 |
| 6,921,308 | B2 * | 7/2005 | Tanaka et al. | 440/89 F |
| 7,938,226 | B2 * | 5/2011 | Bagheri | 181/241 |
| 2004/0026165 | A1 * | 2/2004 | Takahashi et al. | 181/253 |
| 2004/0195278 | A1 * | 10/2004 | Leeuw | 222/504 |
| 2004/0216950 | A1 * | 11/2004 | Weinert et al. | 181/237 |
| 2007/0080020 | A1 * | 4/2007 | Emmett | 181/237 |
| 2010/0170743 | A1 * | 7/2010 | Meneely et al. | 181/237 |

* cited by examiner

*Primary Examiner* — Forrest M Phillips
(74) *Attorney, Agent, or Firm* — Morgan, Lewis & Bockius LLP

(57) ABSTRACT

A condensed water discharge apparatus is capable of smoothly excreting residual condensed water in a muffler. The device may include a through hole formed at the bottom of a muffler case, an inflow pipe communicated to the muffler case and in which exhaust gas flows, an exhaust pipe communicated to the atmosphere so that exhaust gas is exhausted from the muffler case thereto, a thermoelement, and a control valve mounted at the through hole so as to selectively open/close the through hole when driving or stopped by sliding about the through hole.

7 Claims, 5 Drawing Sheets

CONDENSED WATER DISCHARGE APPARATUS OF MUFFLER

CROSS-REFERENCE TO RELATED APPLICATION

This application claims priority to Korean Patent Application No. 10-2009-0112834 filed Nov. 20, 2009, the entire contents of which application is incorporated herein for all purposes by this reference.

BACKGROUND OF THE INVENTION

1. Field of the Invention

The present invention relates to a condensed water discharge apparatus, and more particularly to a condensed water discharge apparatus capable of smoothly excreting residual condensed water in a muffler.

2. Description of the Related Art

Generally, a catalytic converter and an electronic control fuel injection device are installed to an exhaust pipe as exhaust gas reduction measures.

CO and HC are oxidized, and NOx is reduced so as to reduce harmful substances that pass through a catalytic converter.

A catalytic converter including a support mounted therein includes platinum, rhodium, and the like disposed at a surface of the support so as to pass exhaust gas. thereby, CO and HC are oxidized and NOx is reduced so as to reduce harmful substances.

In this way, when the CO and HC are oxidized, carbon dioxide and condensed water are generated, and thereby the exhaust system is corroded and the durability thereof is deteriorated. Therefore, as an exhaust gas reduction measure, an exhaust system is mounted at a muffler having low temperature and pressure of exhaust. The conventional device for exhausting condensed water includes an exhaust hole formed at a lower portion of a rear plate of a muffler case as the first method, or a hole is formed inside the case and a suction pipe encompassing the hole is provided or a guide plate is mounted so that it faces the bottom thereof as the second method.

However, although the first method has an advantage of ease in exhausting condensed water, the conventional device for exhausting condensed water has drawbacks that a condensed water exhaust hole is communicated to the atmosphere, and when the exhaust gas is expanded at the muffler, an expanding sound or flow noise causing deterioration of performance or noise pollution is generated toward the atmosphere.

And the second method has a feature that condensed water is sucked and discharged by pressure of exhaust gas to the atmosphere in case of driving, and thereby if the suction pipe or the hole having a small diameter is blocked by exhaust gas or a malfunction of a vehicle, the condensed water cannot be discharged.

The conventional structure for discharging condensed water has the best performance when sufficient pressure of the exhaust gas is supplied thereto.

However, in the case of an idle state or stop state after driving, condensed water remains in the muffler case.

When it is considered that a stop state is more frequent than a driving state, it has been found that the corrosion still occurs.

In the case of just forming a hole at the bottom of the case to solve the problem, the condensed water is discharged easily, but at the same time, the exhaust gas is exhausted through the hole when driving, and the emission is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a condensed water discharge apparatus of a muffler having advantages of easing excretion of condensed water and improving performance thereof.

A condensed water discharge apparatus of a muffler may include: a through hole formed at the bottom of a muffler case, an inflow pipe communicated to the muffler case and in which exhaust gas flows, an exhaust pipe communicated to the atmosphere so that exhaust gas is exhausted from the muffler case thereto, a thermoelement, and a control valve mounted at the through hole so as to selectively open/close the through hole when driving or stopped by sliding about the through hole.

Further, the control valve may include a valve body formed with a cylindrical shape, upper/lower flanges respectively formed at an upper end and a lower end of the valve body so as to be symmetrical about the bottom of the case, and an electromagnet interposed between the upper flange and the lower flange.

Further, the electromagnet may be formed with a circular-plate shape, and has the same diameter as the upper/lower flanges.

Further, the device may further include a spacer between the electromagnet and the upper flange of the control valve.

Further, the spacer may be formed as a steel use stainless (SUS) mat.

The control valve may further include a plurality of exhaust holes.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
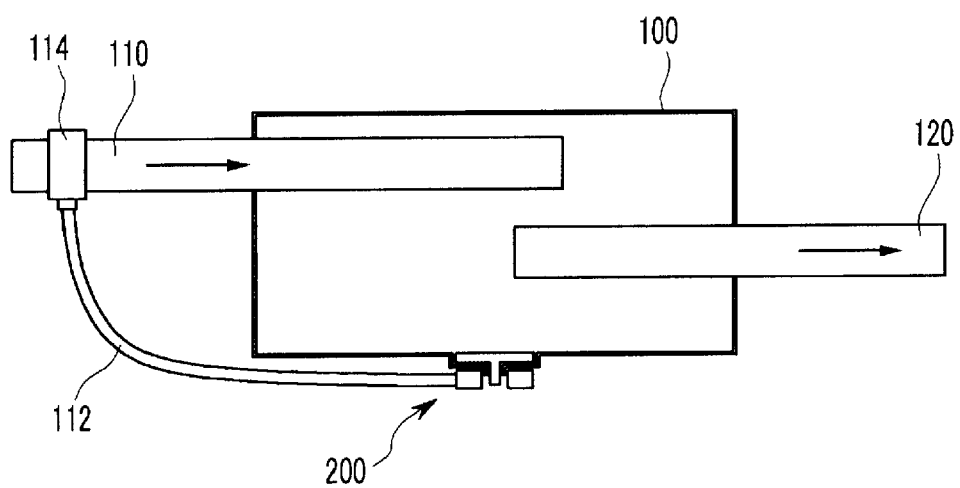
FIG. 1 is a schematic view of an exemplary condensed water discharge apparatus of a muffler according to the present invention.

As shown in FIG. 1, an exemplary condensed water discharge apparatus of a muffler according to the present invention includes a case 100, an inflow pipe 110 for inflow of exhaust gas to the inside of the case 100, a thermoelement 114 mounted at the inflow pipe 110, an exhaust pipe 120 for exhausting the exhaust gas outwardly, and a control valve 200.

The case 100 is a body of the muffler.

Herein, though not shown in the drawings, a structure of a muffler case includes a plurality of partitioning plates partitioning the inside of the case, an expansion chamber, and a communication pipe.

Further, a through hole 201 is formed at the bottom of the case 100, and a control valve 200 is mounted at the through hole.

Figure 2:
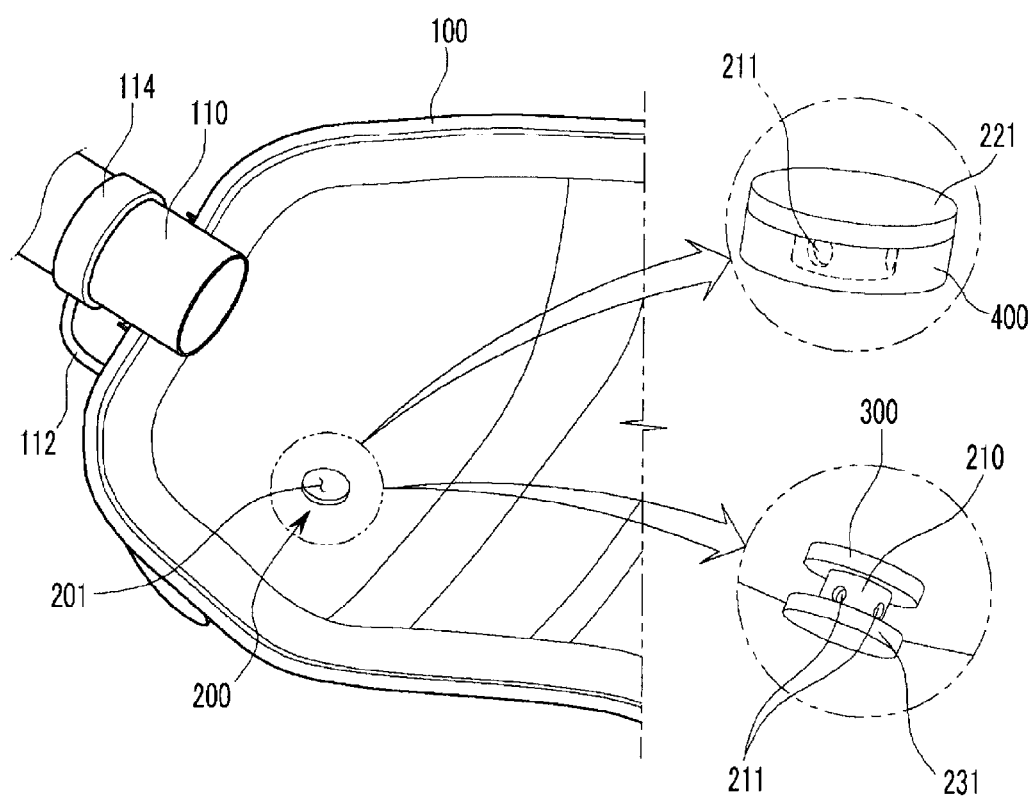
FIG. 2 is a perspective view showing a main portion of an exemplary condensed water discharge apparatus of a muffler according to the present invention.
Figure 3:
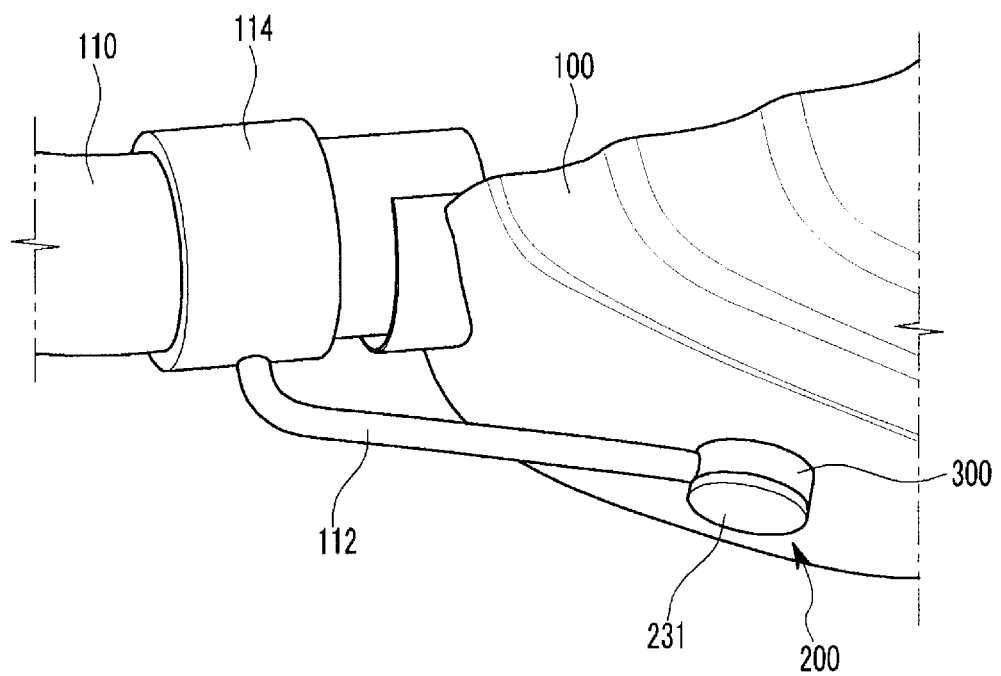
FIG. 3 is a perspective view showing a lower portion of an exemplary condensed water discharge apparatus of a muffler according to the present invention.

The control valve 200 includes, as shown in FIG. 2 and FIG. 3, a valve body 210, upper/lower flanges 221 and 231, and a plurality of exhaust holes 211 formed at the valve body 210.

The upper flange 221 is disposed at an inner wall of the muffler case 100 and the lower flange 231 is disposed at an outer wall of the muffler case 100, that is, the upper flange 221 and the lower flange 231 are symmetrical to each other with respect to the through hole 201.

Herein, the valve body 210 is formed to have the same diameter as that of the through hole 201, and the upper/lower flanges 221 and 231 having a larger diameter than that of the valve body 210 are respectively formed at an upper portion and a lower portion of the valve body 210.

An electromagnet 300 is interposed between the lower flange 231 and the muffler case 100.

The electromagnet 300 is electrically connected to the thermoelement 114 through a sheath 112.

In a process in which a plurality of exhaust holes 211 formed at the valve body 210 are selectively opened/closed with respect to the through hole 201 of the case 100, when the valve body 210 appears from the inner side of the case 100, the interior and the exterior of the case 100 are communicated.

Further, when the lower flange 231 of the valve body 210 blocks the through hole 201, the interior and the exterior of the case are separated.

Thus, a lower flange 231 is formed at a bottom of the valve body 210 so that the through hole 201 is blocked completely when the valve body 210 is moved upwardly.

The control valve 200 may be fixed thereto by a bolt (not shown) or a nut (not shown) and the like.

In this way, exhaust gas exhausted from an exhaust manifold is expanded through the inflow pipe 110 in the muffler case 100, and then pressure and temperature thereof are decreased and it is exhausted.

Meanwhile, the exhaust gas flows into the case 100, and simultaneously condensed water generated from the catalytic converter flows into the case 100.

At this time, the control valve 200 is transformed so that the through hole 201 is closed by heat of the exhaust gas or the condensed water, and thereby the condensed water cannot be discharged through the through hole 201.

Subsequently, after a vehicle is stopped, the condensed water remains at the bottom of the case 100 in a cooled state, and at this time, the control valve 200 is moved so that it opens the through hole 201 such that the residual condensed water is discharged outwardly.

Further, a thermoelement 114 is mounted at the inflow pipe 110.

The thermoelement 114 uses a difference between a high-temperature portion and a low-temperature portion.

That is, the thermoelement 114 detects the temperature inside the inflow pipe 110, and when driving, the thermoelement 114 generates electric power with the high-temperature exhaust gas.

On the contrary, when the vehicle is stopped, the heat is not generated, so the electric power cannot be generated by the thermoelement 114.

Figure 4:
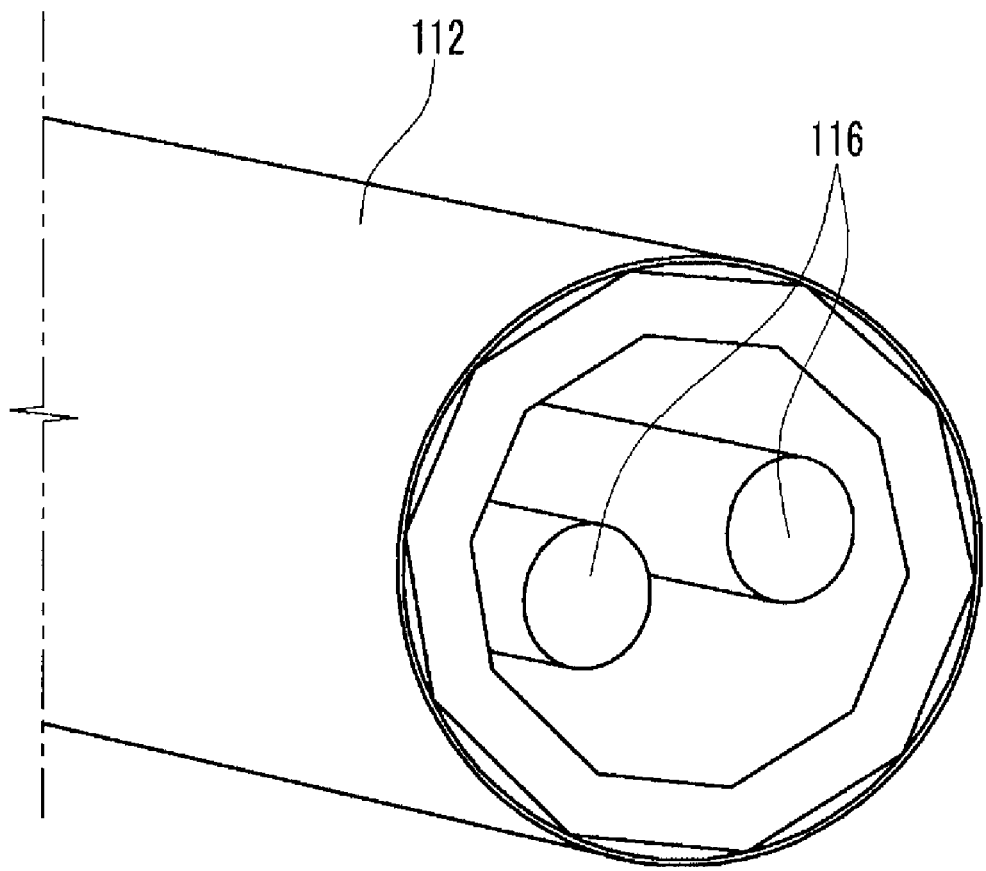
FIG. 4 is a perspective view showing the inside of a sheath applied to an exemplary condensed water discharge apparatus of a muffler according to the present invention.

Herein, the thermoelement 114 is connected to the electromagnet 300 through a sheath 112, as shown in FIG. 4.

The sheath 112 may preferably be an aluminum protector having a function of an insulator.

An electric wire 116 is mounted inside of the sheath 112 so as to transmit electricity generated by the thermoelement 114 to the electromagnet 300.

Meanwhile, a separate spacer 400 may be provided between the upper flange 221 and the muffler case 100.

The spacer 400 maintains a predetermined distance between the upper flange 221 and the muffler case 100 so as to avoid completely blocking the through hole 201 in case of an engine stop.

At this time, the spacer 400 may preferably be a steel use stainless (SUS) mat, that is a stainless steel mat. One should appreciate that other suitable materials may also be utilized.

An operation of an exemplary condensed water discharge apparatus of a muffler according to the present invention will hereinafter be described in detail.

Figure 5:
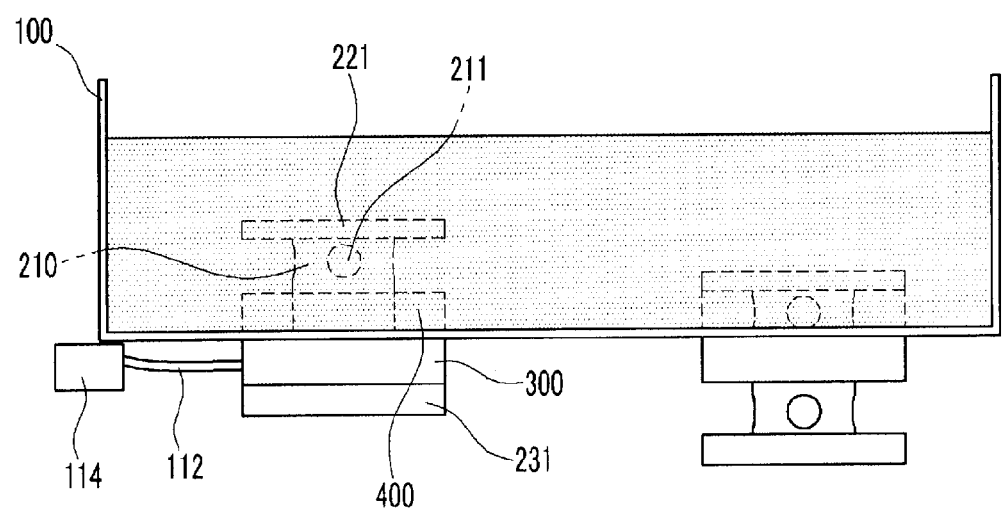
FIG. 5 is cross-sectional view showing an operation of an exemplary condensed water discharge apparatus of a muffler according to the present invention.

As shown in FIG. 5, the temperature of the inflow pipe 110 is increased and then electric power is generated by the thermoelement 114 in case of a driving or idle state.

Further, the electromagnet attracts the lower flange 231 with the electric power, and the through hole 201 of the muffler case 100 is blocked.

That is, the through hole 201 is blocked in case of engine operation so as to avoid discharge of the condensed water.

On the contrary, the temperature of the inflow pipe 110 is decreased in the case of engine stopping, so electric power is not generated by the electromagnet 114.

At this time, when the electric power off, the lower flange 231 is moved downwardly.

Therefore, the interior and exterior of the muffler case 100 are communicated such that the condensed water in the muffler case 100 is discharged outwardly.

As can be seen from the forgoing, a condensed water discharge device is mounted at the bottom of the muffler case so that the condensed water can be discharged to the outside when stopped, and thereby corrosion of the muffler caused by the condensed water is minimized so as to lengthen the life thereof.

Further, because the condensed water is automatically discharged, the corrosion of the muffler case caused by the condensed water is negated, and so the life thereof is lengthened and simultaneously the manufacturing cost is decreased by the lack of need to use an anti-corrosive material.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A condensed water discharge apparatus of a muffler, comprising:
   a through hole formed at a bottom of a muffler case;
   an inflow pipe fluidly communicating with an interior of the muffler case through which exhaust gas flows;
   an exhaust pipe fluidly communicating with atmosphere so that exhaust gas is exhausted from the muffler case therethrough;
   a thermoelement mounted adjacent the inflow pipe to generate an electric power with a temperature of exhaust gas; and
   a control valve that is mounted at the through hole and is electrically connected with the thermoelement so as to selectively open and close the through hole by the electric power of the thermoelement when a vehicle is driven or stopped;
   wherein the control valve includes:
      a valve body having a cylindrical shape;
      upper and lower flanges respectively formed at an upper end and a lower end of the valve body so as to be symmetrical about the bottom of the case, the upper flange disposed inside the muffler case and the lower flange being disposed outside the muffler case; and
      an electromagnet interposed between the upper flange and the lower flange and, electrically connected with the thermoelement, wherein the electromagnet selectively opens the through hole by the electric power received from the thermoelement.

2. The condensed water discharge apparatus of claim 1, wherein the electromagnet has an annular shape, and has the same outer diameter as the lower flanges.

3. The condensed water discharge apparatus of claim 1, further comprising a spacer between the electromagnet and the upper flange of the control valve.

4. The condensed water discharge apparatus of claim 3, wherein the spacer is a steel use stainless (SUS) mat.

5. The condensed water discharge apparatus of claim 1, wherein the control valve comprises a valve body slidably disposed about the through hole.

6. The condensed water discharge apparatus of claim 1, wherein the control valve further comprises a plurality of exhaust holes.

7. A muffler comprising the condensed water discharge apparatus of claim 1.

* * * * *